United States Patent [19]

Matsushiro et al.

[11] Patent Number: 4,999,797
[45] Date of Patent: Mar. 12, 1991

[54] METHOD OF AND DEVICE FOR CIRCLE GENERATION

[75] Inventors: Nobuhito Matsushiro; Ikuo Oyake, both of Tokyo, Japan

[73] Assignee: Oki Electric Industry Co., Ltd., Tokyo, Japan

[21] Appl. No.: 277,968

[22] Filed: Nov. 30, 1988

[30] Foreign Application Priority Data

Dec. 7, 1987 [JP] Japan .................................. 62-307691

[51] Int. Cl.$^5$ .............................................. G06F 1/02
[52] U.S. Cl. ................................................... 364/720
[58] Field of Search ................ 364/720, 718, 719, 518

[56] References Cited

U.S. PATENT DOCUMENTS

| | | | |
|---|---|---|---|
| 4,314,351 | 2/1982 | Postel et al. | 364/720 |
| 4,371,933 | 2/1983 | Bresenham et al. | 364/300 |
| 4,677,573 | 6/1987 | Brown et al. | 364/521 |
| 4,692,887 | 9/1987 | Hashidate | 364/720 |

FOREIGN PATENT DOCUMENTS

| | | | |
|---|---|---|---|
| 54-116141 | 10/1979 | Japan | 364/720 |
| 60-209878 | 10/1985 | Japan | 364/720 |
| 1352292 | 5/1974 | United Kingdom . | |
| 1353479 | 5/1974 | United Kingdom . | |
| 2141608 | 12/1984 | United Kingdom . | |

OTHER PUBLICATIONS

Sonderdruck aus der Siemens-Zeitschrift, H.2, Feb. 1966, S. 61–66.
"Principles of Interactive Computer Graphics", Newman Sproull, published by McGraw-Hill, pp. 27–28.

*Primary Examiner*—Gary V. Harkcom
*Assistant Examiner*—Tan V. Mai
*Attorney, Agent, or Firm*—Spencer & Frank

[57] ABSTRACT

A machine-implemented circle-generation method calculates a sequence of coordinates $(x_n, y_n)$ of points approximating a circle or circular arc according to the iterative formula:

$$[x_{n+1}\ y_{n+1}] = [x_n\ y_n] \begin{bmatrix} \dfrac{(1-\epsilon^2)}{(1+\epsilon^2)} & \dfrac{-2\epsilon}{(1+\epsilon^2)} \\ \dfrac{2\epsilon}{(1+\epsilon^2)} & \dfrac{(1-\epsilon^2)}{(1+\epsilon^2)} \end{bmatrix}$$

or an approximation thereto. This formula is suitable for high-speed computation and approximates a true circle extremely closely. When rounded off to integer coordinates, the starting and ending points of a full circle coincide.

13 Claims, 3 Drawing Sheets

METHOD OF AND DEVICE FOR CIRCLE GENERATION

BACKGROUND OF THE INVENTION

This invention relates to a machine-implemented method of and device for circle generation. More particularly, it pertains to a circle-generation employing a digital differential analyzer algorithm.

In fields such as computer graphics, computer-controlled printing, and computer-aided design it is frequently necessary to generate circles and circular arcs by calculating coordinates representing a consecutive sequence of points on the circle or arc. One method for generating such circles and arcs that is described, for example, on pages 27 and 28 of *Principles of Interactive Computer Graphics* by Newman Sproull, published by McGraw-Hill, employs the general class of algorithms known as digital differential analyzers (hereinafter denoted DDA). The basic DDA circle-generation algorithm is derived from the differential equation of a circle centered at the origin of the coordinate system:

$$\frac{dy}{dx} = -\frac{x}{y} \quad (1)$$

The discrete form of this equation is the difference equation (2):

$$\frac{y_{n+1} - y_n}{x_{n+1} - x_n} = -\frac{x_n}{y_n} \quad (2)$$

in which $x_n$ and $y_n$ are the coordinates of the n-th point on the circle, $x_{n+1}$ and $y_{n+1}$ are the coordinates of the (n+1)-th point on the circle, and n is zero or a positive integer.

Solutions to equation (2) have the following form:

$$x_{n+1} = x_n + \epsilon y_n$$

$$y_{n+1} = y_n - \epsilon x_n \quad (3)$$

If the circle or arc will be displayed on a raster device in which coordinates are expressed in integer pixel counts, and if the radius of curvature r of the circle or arc falls in the range:

$$2^{(m-1)} \leq r < 2^m \quad (4)$$

then the value of $\epsilon$ should be $2^{-m}$ to prevent the spacing between successive points from exceeding the distance between pixels. Making $\epsilon$ a negative power of 2 facilitates implementation of the algorithm in a computing device by allowing right shifts to be substituted for multiplications.

The basic DDA circle-generation algorithm can be conveniently expressed by rewriting equation (3) as the matrix equation (5), in which the vector $[x_n\ y_n]$ represents the n-th point on the circle and the vector $[x_{n+1}\ y_{n+1}]$ represents the (n+1)-th point. The algorithm calculates $[x_{n+1}\ y_{n+1}]$ from $[x_n\ y_n]$ by performing matrix multiplication:

$$[x_{n+1}\ y_{n+1}] = [x_n\ y_n] \begin{bmatrix} 1 & -\epsilon \\ \epsilon & 1 \end{bmatrix} \quad (5)$$

A problem with this algorithm is that the determinant of its matrix exceeds unity:

$$\begin{vmatrix} 1 & -\epsilon \\ \epsilon & 1 \end{vmatrix} = 1 + \epsilon^2 > 1$$

A consequence is that this algorithm plots not a true circle but a spiral in which successive points are disposed successively farther from the origin. If a complete circle is plotted, the starting point fails to coincide with the ending point.

A prior-art solution to this problem given in the reference cited above is to compute $y_{n+1}$ from $x_{n+1}$ instead of $x_n$. The preceding solution (3) is then modified as follows:

$$x_{n+1} = x_n + \epsilon y_n$$

$$y_{n+1} = y_n - \epsilon x_{n+1} \quad (6)$$

A DDA circle-generation algorithm according to (6) can be expressed by the matrix equation (7):

$$[x_{n+1}\ y_{n+1}] = [x_n\ y_n] \begin{bmatrix} 1 & -\epsilon \\ \epsilon & 1 - \epsilon^2 \end{bmatrix} \quad (7)$$

The matrix in this equation has a determinant of unity:

$$\begin{vmatrix} 1 & -\epsilon \\ \epsilon & 1 - \epsilon^2 \end{vmatrix} = 1$$

Accordingly, successive points do not spiral outward, and if a complete circle is plotted, the starting and ending points coincide. However, the result is still not a true circle, because the algorithm shown in equation (7) is derived by altering the differential equation (1) to equation (8):

$$\frac{dy}{dx} = -\frac{x}{y} - \epsilon \quad (8)$$

Equation (8) does not describe a circle. As pointed out in the reference cited above, the departure from circularity may be quite large for large values of $\epsilon$.

SUMMARY OF THE INVENTION

It is therefore an object of this invention to solve the preceding problems of noncircularity and noncoincidence of the starting and ending points and provide a DDA circle-generation method capable of generating highly accurate circles and circular arcs.

A machine-implemented circle-generation method for approximating a circle or circular arc according to this invention comprises steps of providing a pair of starting coordinates $(x_0, y_0)$ and a positive value $\epsilon$ less than 1, generating a sequence of coordinates $(x_1, y_1)$, $(x_2, y_2)$, . . . from the starting coordinates $(x_0, y_0)$ and positive value by iteration of the following matrix computation:

$$[x_{n+1}\ y_{n+1}] = [x_n\ y_n] \begin{bmatrix} \frac{(1-\epsilon^2)}{(1+\epsilon^2)} & \frac{-2\epsilon}{(1+\epsilon^2)} \\ \frac{2\epsilon}{(1+\epsilon^2)} & \frac{(1-\epsilon^2)}{(1+\epsilon^2)} \end{bmatrix}$$

or an approximation thereto, and driving an output device in accordance with the generated sequence of coordinates.

A preferred approximation to the preceding matrix computation is the following:

$$[x_{n+1}\ y_{n+1}] = [x_n\ y_n] \begin{bmatrix} 1-2\epsilon^2 & 2\epsilon^3 - 2\epsilon \\ 2\epsilon - 2\epsilon^3 & 1 - 2\epsilon^2 \end{bmatrix}$$

A circle-generation device according to this invention comprises at least a control unit for determining a pair of starting coordinates ($x_0$, $y_0$) and a positive value $\epsilon$ less than 1, an arithmetic-logic unit for receiving the starting coordinates ($x_0$, $y_0$) and positive value $\epsilon$ from the control unit, iteratively performing the computation $$[x_{n+1}\ y_{n+1}] = [x_n\ y_n] \begin{bmatrix} \frac{(1-\epsilon^2)}{(1+\epsilon^2)} & \frac{-2\epsilon}{(1+\epsilon^2)} \\ \frac{2\epsilon}{(1+\epsilon^2)} & \frac{(1-\epsilon^2)}{(1+\epsilon^2)} \end{bmatrix}$$

or an approximation thereto, preferably the approximation given above, and returning the resultant sequence of coordinates ($x_n$, $y_n$) to the control unit, and an output unit for receiving the resultant sequence of coordinates ($x_n$, $y_n$) from the control unit and exhibiting the curve described by them.

DETAILED DESCRIPTION OF THE EMBODIMENTS

Prior to an explanation of the embodiments of the invention, its underlying geometric principle will be described with reference to FIG. 1.

Figure 1:
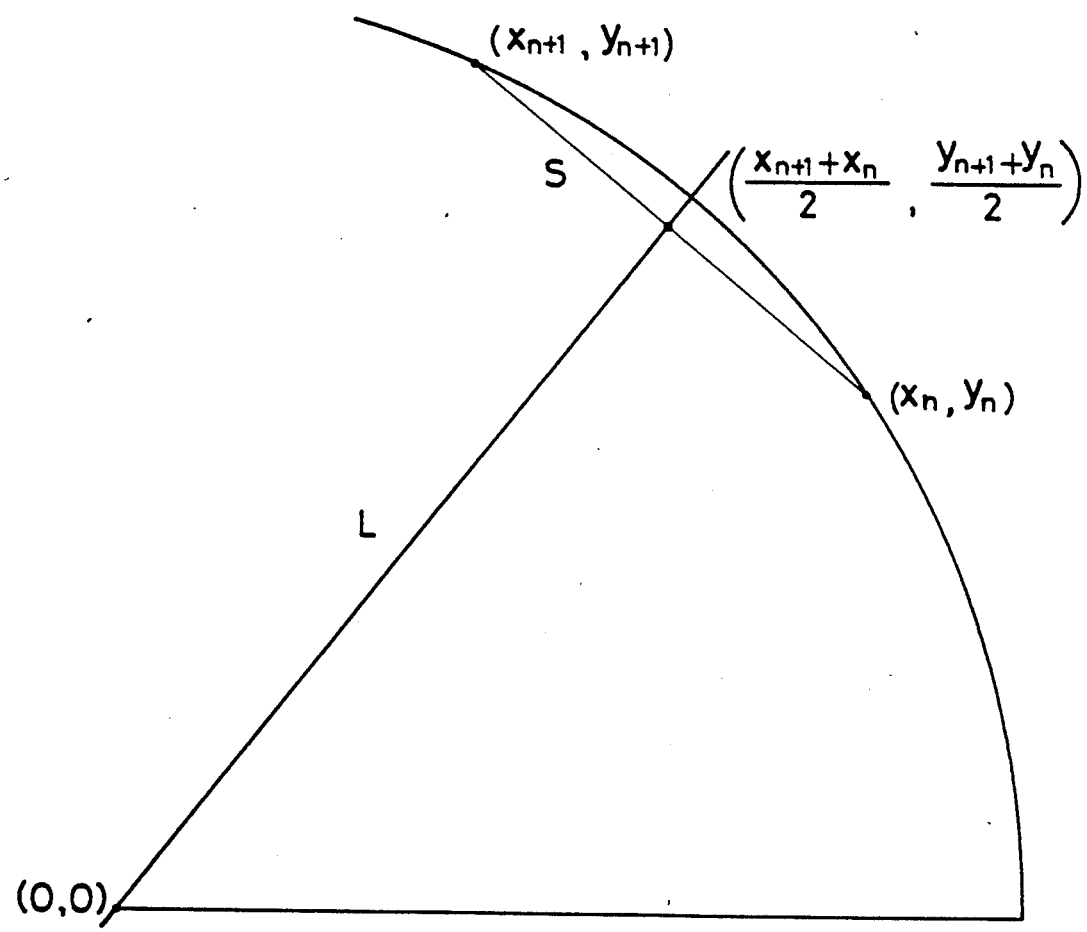
FIG. 1 is a sketch illustrating the geometrical principle underlying this invention.

FIG. 1 shows two points ($x_n$, $y_n$) and ($x_{n+1}$, $y_{n+1}$) disposed on an arc of a circle and joined by a chord S. A line L is drawn from the center (0, 0) of the circle through the midpoint of the chord S. Elementary geometry shows that the lines S and L are perpendicular; i.e. that they have mutually negative reciprocal slopes, a statement which is equivalent to equation (9):

$$\frac{y_{n+1} - y_n}{x_{n+1} - x_n} = -\frac{\frac{x_{n+1} + x_n}{2}}{\frac{y_{n+1} + y_n}{2}} \tag{9}$$

$$= -\frac{x_{n+1} + x_n}{y_{n+1} + y_n}$$

Equation (9) can be rewritten as equation (10), in which $\epsilon$ is an arbitrary positive constant.

$$y_{n+1} - y_n = -\epsilon(x_{n+1} + x_n)$$
$$x_{n+1} - x_n = \epsilon(y_{n+1} + y_n) \tag{10}$$

It can easily be verified that solutions for $x_{n+1}$ and $y_{n+1}$ in equation (10) have the form:

$$x_{n+1} = \frac{(1-\epsilon^2)}{(1+\epsilon^2)} x_n + \frac{2\epsilon}{(1+\epsilon^2)} y_n \tag{11}$$

$$y_{n+1} = \frac{(1-\epsilon^2)}{(1+\epsilon^2)} y_n + \frac{2\epsilon}{(1+\epsilon^2)} x_n$$

Equation (11) can be expressed in matrix form as equation (12):

$$[x_{n+1}\ y_{n+1}] = [x_n\ y_n] \begin{bmatrix} \frac{(1-\epsilon^2)}{(1+\epsilon^2)} & \frac{-2\epsilon}{(1+\epsilon^2)} \\ \frac{2\epsilon}{(1+\epsilon^2)} & \frac{(1-\epsilon^2)}{(1+\epsilon^2)} \end{bmatrix} \tag{12}$$

The coefficient matrix of equation (12):

$$\begin{bmatrix} \frac{(1-\epsilon^2)}{(1+\epsilon^2)} & \frac{-2\epsilon}{(1+\epsilon^2)} \\ \frac{2\epsilon}{(1+\epsilon^2)} & \frac{(1-\epsilon^2)}{(1+\epsilon^2)} \end{bmatrix}$$

has the determinant 1. Geometrically, this matrix describes a length-preserving rotation of the coordinate plane about the origin. Therefore, the curve generated by joining successive points ($x_n$, $y_n$) calculated by equation (12) approximates a true circular arc and does not spiral outward. If propagated through a full 360°, it approximates a true circle the starting and ending points of which coincide. Equation (12) can thus be used as the basis of an error-free DDA circle-generation algorithm.

For a circle or arc to be plotted on a raster device, if the radius of curvature r expressed in pixels is in the range $2^{(m-1)} \leq r < 2^m$, then to ensure that the space between successive points does not exceed the pixel spacing, the value of $\epsilon$ should preferably be $2^{-(m+1)}$. This is half the value of $\epsilon$ in the prior art, compensating for the cancellation of the divisors 2 in equation (9).

Next a preferred approximation to equation (12) will be derived. Since $|\epsilon| < 1$, the terms $(1-\epsilon^2)/(1+\epsilon^2)$ and $2\epsilon/(1+\epsilon^2)$ that occur as elements in the coefficient matrix in equation (12) can be expanded as shown in equation (13):

$$(1-\epsilon^2)/(1+\epsilon^2) = (1-\epsilon^2)(1-\epsilon^2+\epsilon^4-\epsilon^6+\ldots) = \tag{13}$$
$$1 - 2\epsilon^2 + 2\epsilon^4 - 2\epsilon^6 + 2\epsilon^8 + - \ldots)$$

$$2\epsilon/(1+\epsilon^2) = 2\epsilon(1-\epsilon^2+\epsilon^4-\epsilon^6+\ldots) =$$

-continued $$2\epsilon - 2\epsilon^3 + 2\epsilon^5 - 2\epsilon^7 + \ldots )$$

If the right sides of the equation (13) are approximated through the second-degree term, the result is equation (14):

$$\frac{1 - \epsilon^2}{1 + \epsilon^2} \approx 1 - 2\epsilon^2 \qquad (14)$$

$$\frac{2}{1 + \epsilon^2} \approx 2\epsilon - 2\epsilon^3$$

A preferred approximate form of the DDA circle-generation algorithm of equation (12) can thus be obtained by rewriting equation (12) with the matrix elements approximated by equation (14), obtaining equation (15):

$$[x_{n+1}\ y_{n+1}] = [x_n\ y_n] \begin{bmatrix} 1 - 2\epsilon^2 & 2\epsilon^3 - 2\epsilon \\ 2\epsilon - 2\epsilon^3 & 1 - 2\epsilon^2 \end{bmatrix} \qquad (15)$$

This equation (15) is suitable for high-speed computation when $\epsilon$ is a negative power of 2. It also gives a very close approximation to a true circle or circular arc. A brief discussion of the approximation error follows.

The matrix in equation (15) describes a rotation of the coordinate system followed by a dilatation by a factor less than unity. The dilatation causes successive points to spiral in toward the center, but the spiraling is extremely slight: an algebraic calculation shows that at each iteration of the calculation in equation (15), distances from the center are reduced by a factor of only:

$$(1 - 4\epsilon^4 + 4\epsilon^6)^{\frac{1}{2}}$$

If $\epsilon = 2^{-(m+1)}$, it can be demonstrated that $2^{m+3}$ iterations of equation (15) more than suffice to complete a full 360° circle. The total dilatation during $2^{m+3}$ iterations is:

$$\begin{aligned}
(1 - 4\epsilon^4 + 4\epsilon^6)^P &= (1 - 2^{-4m-2} + 2^{-6m-4})^P \qquad (16) \\
&> (1 - 2^{-4m-2})^P \\
&> 1 - 2^{-4m-2}P \\
&> 1 - 2^{-3m}
\end{aligned}$$

where $\epsilon = 2^{-(m+1)}$ and $P = 2^{m+3}/2 = 2^{m+2}$

Let E be the difference between the starting and ending points of a full circle of radius r plotted using equation (15), where $r < 2^m$. From equation (16) it follows that:

$$E < 2^{-3m}r < 2^{-3m}2^m = 2^{-2m} \qquad (17)$$

Since m is a positive integer, the error is less than 0.25. Thus if the circle is plotted on a raster device and coordinates are rounded off to the nearest integer, the starting and ending points will plot to the same pixel. The error at intermediate points will be even less than the error at the ending point, so intermediate points will also be plotted accurately.

When the calculation in equation (15) is performed on a computing device, further inaccuracy will be introduced at each iteration due to the rounding or truncation error of the computing device. In implementations of the algorithm given by equation (15) on computing devices using a variety of microprocessors, however, it has been found that this error is so small that the ending point of a full circle still rounds off to the same integer coordinates as the starting point.

Next a preferred embodiment of this invention in a circle-generation device will be discussed with reference to FIG. 2, which shows the general configuration of a circle-generation device for executing the preceding algorithm. The circle-generation device comprises a control unit 10, an arithmetic-logic unit 20, and an output unit 30. The control unit receives from an outside source, such as a keyboard 40 or a data processing device 50 information specifying the circle or arc to be drawn. In the case of an arc, for example, it may receive the coordinates of the starting point and ending point and of the center of curvature. In the case of a circle, it may receive the radius of the circle and the coordinates of its center. From this information the control unit performs a coordinate transformation so that the circle is centered at the origin (0, 0), determines the coordinates of the starting point ($x_0$, $y_0$) in this new coordinate system, determines the value of m such that the radius of curvature of the arc or circle is less than $2^m$ but not less than $2^{m-1}$, and determines the conditions for completion of the computation: for example, the number of times the computation is to be iterated. The control unit sends the values of $x_0$, $y_0$, and m to the arithmetic-logic unit 20.

The arithmetic-logic unit 20 comprises for example, registers, i.e. shift registers, for storing values and circuits for performing addition, subtraction, and right shift operations on the stored values. On the basis of the information received from control unit 10, the arithmetic-logic unit 20 performs operations to execute the matrix multiplication in equation (15), thus computing the coordinates of the point ($x_1$, $y_1$) from the point ($x_0$, $y_0$), and returns the values $x_1$ and $y_1$ to the control unit. Next, the arithmetic-logic unit 20 repeats the same operation to compute the coordinates of the point ($x_2$, $y_2$) from ($x_1$, $y_1$), then ($x_3$, $y_3$) from ($x_2$, $y_2$) and so on until the completion condition determined by the control unit is satisfied. At each iteration it returns the coordinates ($x_n$, $y_n$) of the newly calculated point to the control unit 10.

The output unit converts the coordinates received from the arithmetic-logic unit 20 back to the original coordinate system and sends them to the output unit 30, which exhibits them as the desired circle or arc. The output unit 30 can be a device such as a CRT display for exhibiting the circle or arc on a screen, or a printer for printing the circle or arc on paper.

Figure 2:
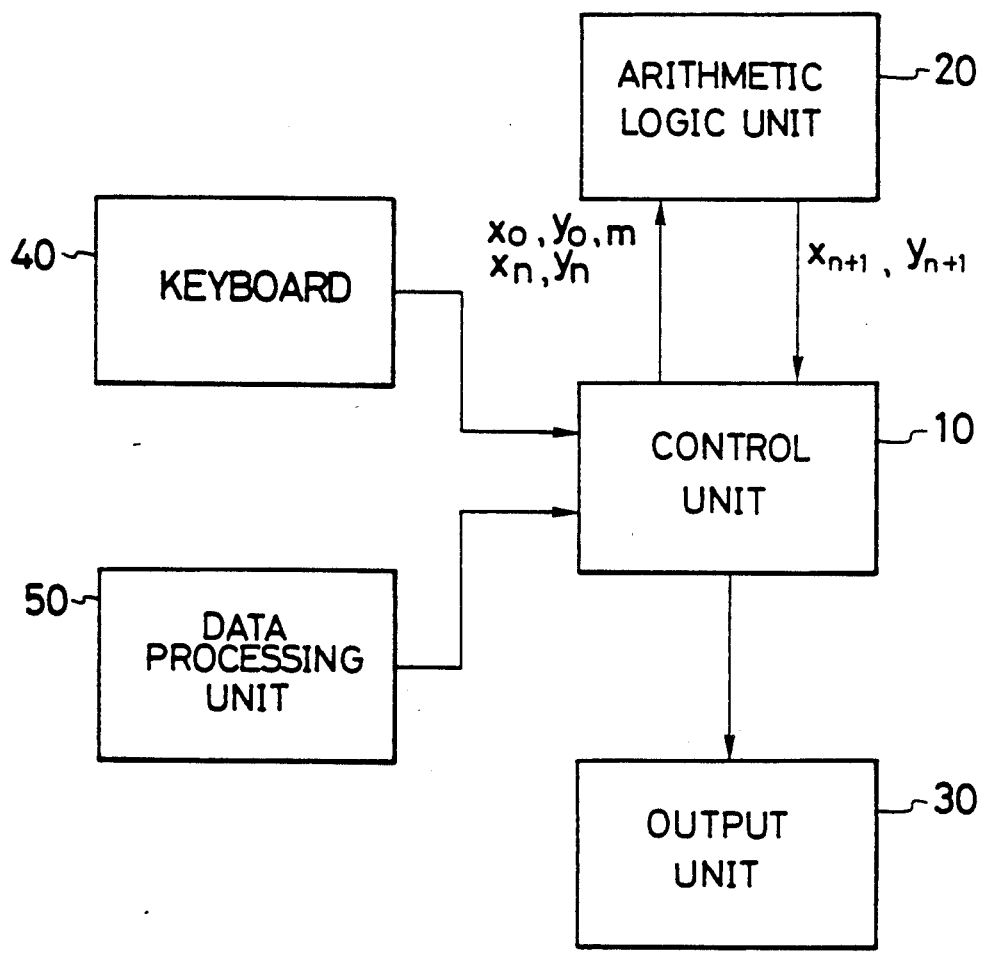
FIG. 2 is a block diagram illustrating a device according to an embodiment of this invention.
Figure 3:
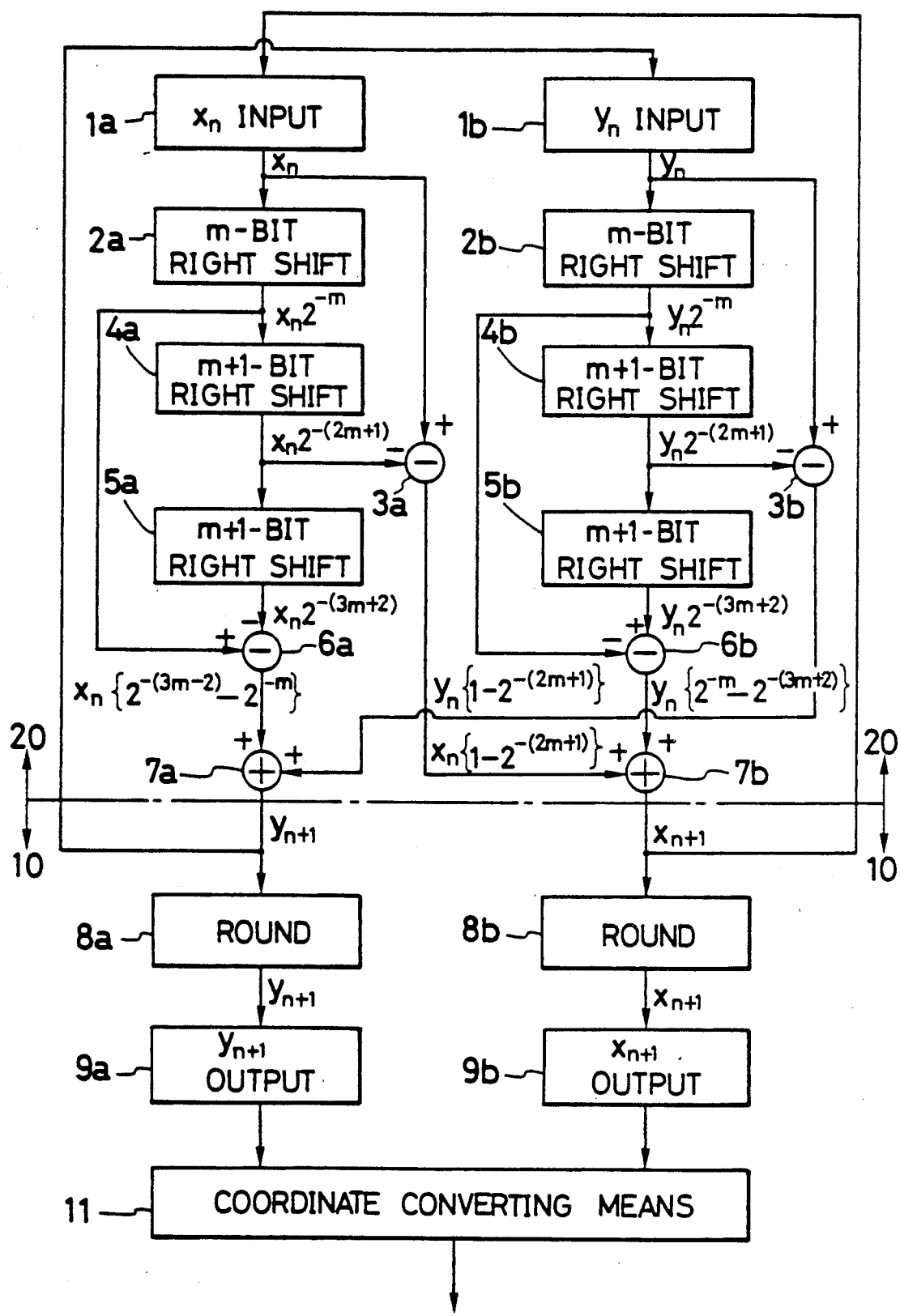
FIG. 3 is a more detailed drawing illustrating an embodiment of the arithmetic-logic unit in FIG. 2.

FIG. 3 is a more detailed drawing illustrating a specific example of the control unit 10 and the arithmetic-logic unit 20 in FIG. 2. As shown in FIG. 3, the arithmetic-logic unit 20 comprises an $x_n$ input means 1a and a $y_n$ input means 1b, a pair of m-bit right shifting means 2a and 2b, a first pair of subtractors 3a and 3b, a first pair of (m+1)-bit right shifting means 4a and 4b, a second pair of (m+1)-bit right shifting means 5a and 5b, a second pair of subtractors 6a and 6b, a pair of adders 7a and 7b, a pair of rounding means 8a and 8b, and a pair of output means 9a and 9b. Initially, the control unit 10 supplies the initial values $x_0$ and $y_0$ determined from the information supplied from the outside source (40, 50). Thereafter, the control unit 10 receives the values $x_{n+1}$, $y_{n+1}$ from the adders 7a, 7b and supplies them to the input means 1a, 1b as new values of $x_n$, $y_n$. The right-shifting means may be programmable shifting means which are programmed according to the value of m received from the control unit 10 in FIG. 2.

When the coordinates of the n-th point $(x_n, y_n)$ of the point sequence are input to the $x_n$ input means 1a and $y_n$ input means 1b, $x_n$ and $y_n$ are sent respectively to the m-bit right shifting means 2a and 2b and the subtractors 3a and 3b. The m-bit right shifting means 2a and 2b perform an m-bit right shift to obtain $x_n 2^{-m}$ and $y_n 2^{-m}$; these values are sent to the first pair of (m+1)-bit right shifting means 4a and 4b and the first subtractors 6a and 6b. The first (m+1)-bit right shifting means 4a and 4b perform an (m+1)-bit right shift to obtain $x_n 2^{-(2m+1)}$ and $y_n 2^{-(2m+1)}$; these values are sent to the second (m+1)-bit right shifting means 5a and 5b, and to the second pair of subtractors 3a and 3b. The subtractor 3a calculates the difference $$x_n\{1-2^{-(2m+1)}\}=x_n(1-2\epsilon^2)$$

between the values $x_n$ and $x_n 2^{-(2m+1)}$ and sends the result to the adder 7b. Similarly, the subtractor 3b calculates the difference $$y_n\{1-2^{-(2m+1)}\}=y_n(1-2\epsilon^2)$$

and sends the result to an adder 7a.

The second pair of (m+1)-bit right shifting means 5a and 5b perform another right shift to obtain $x_n 2^{-(3m+2)}$ and $y_n 2^{-(3m+2)}$; these values are sent to the second pair of subtractors 6a and 6b. The subtractor 6a calculates the difference between $x_n 2^{-(3m+2)}$ and the value $x_n 2^{-m}$ which it receives from the m-bit right shifting means 2a; the subtractor 6b calculates the difference between the value $y_n 2^{-m}$ which it receives from the m-bit right shifting means 2b and $y_n 2^{-(3m+2)}$; the results are as follows:

$$x_n\{2^{-(3m+2)}-2^{-m}\}=x_n(2\epsilon^3-2\epsilon)$$

$$y_n\{2^{-m}-2^{-(3m+2)}\}=y_n(2\epsilon-2\epsilon^3)$$

The values calculated by the subtractors 6a and 6b are sent to the adders 7a and 7b. The adder 7a calculates the y-coordinate $y_{n+1}$ of the (n+1)-th point of the point sequence; the adder 7b calculates the x-coordinate $x_{n+1}$. The coordinate $x_{n+1}$ is returned via the control unit 10 to the $x_n$ input means 1a and the coordinate $y_{n+1}$ to the $y_n$ input means 1b to initiate the next iteration of the computation.

The coordinate $y_{n+1}$ calculated by the adder 7a and the coordinate $x_{n+1}$ calculated by the adder 7b are also sent to the rounding means 8a and 8b in the control unit 10 which round them off to the nearest integer to create the integer coordinate values $(X_{n+1}, Y_{n+1})$ of the (n+1)-th point. The output means 9a and 9b send these integer coordinate values through coordinate converting means 11a and 11b to the output device 30 in FIG. 2.

It is possible for the arithmetic-logic unit 20 to be implemented by a general-purpose circuit such as the arithmetic-logic unit of a general-purpose microprocessor or computer. In this case some of the components shown separately in FIG. 3 can be combined to reduce hardware requirements. If convenient, multiplication means can be used in place of right-shifting means. In this case the control unit 10 should initially send the arithmetic-logic unit 20 instructions for calculating and storing the values $2\epsilon$, $2\epsilon^2$, and $2\epsilon^3$. After calculating and storing these values, the arithmetic-logic unit 20 uses them repeatedly to execute the computation in equation (15), thereby generating a succession of coordinates which it returns to the control unit 10.

In a further modification, the arithmetic-logic unit 20 performs the computation given by equation (12) instead of the computation given by equation (15). The arithmetic-logic unit 20 in this modification comprises, for example, registers for storing values and circuits for performing addition, subtraction, multiplication, and division operations on the stored values. Instead of sending the value m at the beginning of the calculation, the control unit 10 sends the arithmetic-logic unit 20 instructions for calculating and storing the values $(1-\epsilon^2)/(1+\epsilon^2)$ and $2\epsilon/(1+\epsilon^2)$. After calculating and storing these values, the arithmetic-logic unit 20 uses them repeatedly to execute the calculation in equation (12), thereby generating a succession of coordinates which it returns to the control unit.

The scope of the present invention is not limited to the embodiments described above, but includes many modifications and variations which will be obvious to one skilled in the art. Two possible modifications concern the manner in which equation (12) is approximated. Instead of equation (15), it is possible to use the approximation:

$$[x_{n+1}\ y_{n+1}] = [x_n\ y_n] \begin{bmatrix} 1 - 2\epsilon^2 & \epsilon^3 - 2\epsilon \\ 2\epsilon - \epsilon^3 & 1 - 2\epsilon^2 \end{bmatrix}$$

This approximation is more accurate than equation (15), although it may exact a slight computational cost in that it requires right shifts by three different amounts. Another possible approximation is:

$$[x_{n+1}\ y_{n+1}] = [x_n\ y_n] \begin{bmatrix} 1 - 2\epsilon^2 & -2\epsilon \\ 2\epsilon & 1 - 2\epsilon^2 \end{bmatrix}$$

This approximation is slightly less accurate than equation (15), but requires less computation.

Thus, equation (15) and the above two additional approximations can be expressed by the equation $$[x_{n+1}\ y_{n+1}] = [x_n\ y_n] \begin{vmatrix} 1 - 2\epsilon^2 & a\epsilon^2 - 2\epsilon \\ 2\epsilon - a\epsilon^3 & 1 - 2\epsilon^2 \end{vmatrix}$$

respectively for a=2, 1 and 0.

Other modifications are possible as well. For example, it is not necessary for the value of m to satisfy the condition $2^{m-1} \leq r < 2^m$; a smaller or larger value can be used to obtain a coarser or finer approximation to the circle or arc. Nor is it necessary for the calculated coordinates to be rounded off to integers; the rounding means in FIG. 3 can be omitted if the control unit can accept non-integer values. It is also possible to implement the DDA circle-generation method of this invention with values of $\epsilon$ that are not a negative power of two, by using multiplying means instead of the shifting means shown in FIG. 3 for example. It is further possible for the shifting means, subtractors, and adders in FIG. 3 to be replaced by computer programs executing on a central processing unit. Yet another possible modification is for the control unit in FIG. 2 to perform operations other than simple coordinate transformation on the coordinates it receives from the arithmetic-logic unit, or for the control unit to store the calculated coordinates in a memory device before sending them to the output device.

It has been assumed that the output unit 30 is a display or a printer. But the invention is also applicable where the output unit is a numerically controlled machine or a robot having parts (tool or hand) moved along a circle or an arc. In such a case, the moving part is driven according to the sequence of coordinates $(x_n, y_n)$ determined by the arithmetic-logic unit 20 and the control unit 10.

What is claimed is:

1. A circle-generation device comprising:
  a control unit for determining a pair of starting coordinates $(x_0, y_0)$ where $x_0$ and $y_0$ are binary numbers and a positive value $\epsilon$ of the form $2^{-(m+1)}$ where m is a positive integer; and
  an arithmetic-logic unit for receiving said starting coordinates $(x_0, y_0)$ and the positive value $\epsilon$, from said control unit, iteratively performing a matrix computation $$[x_{n+1}\ y_{n+1}] = [x_n\ y_n]\begin{bmatrix} 1 - 2\epsilon^2 & -2\epsilon + a\epsilon^3 \\ 2\epsilon - a\epsilon^3 & 1 - 2\epsilon^2 \end{bmatrix},$$

where is any nonnegative integer and a is equal to 0, 1 or 2, and returning the resultant sequence of coordinates $(x_{n+1}, y_{n+1})$ to said control unit;
  wherein said arithmetic-logic unit comprises:
    shift registers,
    an $x_n$ input means for receiving and storing in the shift registers an x-coordinate $x_n$ in binary digital form,
    a $y_n$ input means for receiving and storing in the shift registers a y-coordinate $y_n$ in binary digital form,
    a right bit-shifting means for performing right bit-shift operations on the x-coordinate $x_n$ and the y-coordinate $y_n$ in the shift registers, so as to obtain the values $2\epsilon x_n$, $2\epsilon y_n$, $2\epsilon^2 x_n$, and $2\epsilon^2 y_n$, $a\epsilon^3 x_n$ and $a\epsilon^3 x_n$, and
    addition and subtraction means for performing addition and subtraction operations on the values obtained from the operations performed by said right bit-shifting means so as to obtain the coordinates $x_n(1-2\epsilon^2) + y_n(2\epsilon - a\epsilon^3) = x_{n+1}$ and $y_n(1-2\epsilon^2) - x_n(-2\epsilon + a\epsilon^3) = y_{n+1}$, and means for sending these coordinates to said $x_n$ and $y_n$ input means to begin the next iteration.

2. A device as in claim 1, further comprising rounding means for receiving said coordinates $x_{n+1}$ and $y_{n+1}$ from said addition and subtraction means and rounding said coordinates of $x_{n+1}$ and $y_{n+1}$ off the nearest integer, and
  and an output unit for receiving the rounded coordinates $x_{n+1}$ and $y_{n+1}$ and producing an approximation of a circle or an arc thereof, according to the sequence of rounded coordinates $(x_{n+1}, y_{n+1})$.

3. A device as in claim 1, further comprising an output unit having means, coupled to said sending means, for receiving and displaying the sequence coordinates $(x_{n+1}, y_{n+1})$.

4. A device as in claim 3, wherein said displaying means comprises a raster display unit.

5. A device as in claim 3, wherein said displaying means comprises a CRT display unit.

6. A device as in claim 3, wherein said displaying means comprises a printer.

7. A circle-generation device as in claim 1, wherein said right bit shifting means includes means for bit shifting $x_n$ by m places to the right, to obtain $2\epsilon x_n$, means for bit shifting $2\epsilon x_n$ by m+1 places to the right to obtain $2\epsilon^2 x_n$, means for bit shifting $2\epsilon^2 x_n$ by m+3-a places to the right to obtain $a\epsilon^3 x_n$, means for bit shifting $y_n$ by m places to the right to obtain $2\epsilon y_n$, means for bit shifting $2\epsilon y_n$ by m+1 places to the right to obtain $2\epsilon^2 y_n$, and means for bit shifting $2\epsilon^2 y_n$ by m+3-a places to the right to obtain $2\epsilon^3 y_n$.

8. A device as in claim 7, further comprising an output unit having means, coupled to said sending means, for receiving and displaying the sequence coordinates $(x_{n+1}, y_{n+1})$.

9. A device as in claim 8, wherein said displaying means comprises a raster display unit.

10. A device as in claim 8, wherein said displaying means comprises a CRT display unit.

11. A device as in claim 8, wherein said displaying means comprises a printer.

12. A circle-generation device comprising:
  a control unit for determining a pair of starting coordinates $(x_0, y_0)$ and a positive value $\epsilon$ of the form $2^{-(m+1)}$ where m is a positive integer; and
  an arithmetic-logic unit for receiving said starting coordinates $(x_0, y_0)$ and the positive value $\epsilon$ from said control unit, iteratively performing a matrix computation $$[x_{n+1}\ y_{n+1}] = [x_n\ y_n]\begin{bmatrix} 1 - 2\epsilon^2 & -2\epsilon + 2\epsilon^3 \\ 2\epsilon x_n - 2\epsilon^3 & 1 - 2\epsilon^2 \end{bmatrix},$$

and returning the resultant sequence of coordinates $(x_n, y_n)$ to said control unit;
  wherein said arithmetic-logic unit comprises:
    an $x_n$ input means for receiving an x-coordinate $x_n$;
    a $y_n$ input means for receiving a y-coordinate $y_n$;
    a pair of m-bit right shifting means for performing an m-bit right shift operation on the x-coordinate $x_n$ and the y-coordinate $y_n$, thus obtaining the values $x_n 2^{-m}$ and $y_n 2^{-m}$;
    a first pair of (m+1)-bit right shifting means for performing an (m+1)-bit right shift operation on the values $x_n 2^{-m}$ and $y_n 2^{-m}$ obtained by said pair of m-bit right shifting means, thus obtaining the values $x_n 2^{-(2m+1)}$ and $y_n 2^{-(2m+1)}$;
    a first pair of subtractors for subtracting the values $x_n 2^{-(2m+1)}$ and $y_n 2^{-(2m+1)}$ obtained by said first pair of (m+1)-bit right shifting means from the values input by said $x_n$ and $y_n$ input means, thus obtaining the values $x_n\{1 - 2^{-(2m+1)}\}$ and $y_n\{1 - 2^{-(2m+1)}\}$;
    a second pair of (m+1)-bit right shifting means for performing an (m+1)-bit right shift operation on the values $x_n 2^{-(2m+1)}$ and $y_n 2^{-(2m+1)}$ obtained by said first pair of (m+1)-bit right shifting means, thus obtaining the values $x_n 2^{-(3m+2)}$ and $y_n 2^{-(3m+2)}$;
    a second pair of subtractors for performing subtraction operations on the values $x_n 2^{-(3m+2)}$ and $y_n 2^{-(3m+2)}$ obtained by said second pair of (m+1)-bit right shifting means and the values $x_n 2^{-m}$ and $y_n 2^{-m}$ obtained by said pair of m-bit right shifting means to obtain the values $x_n\{2^{-(3m+2)} - 2^{-m}\}$ and $y_n\{2^{-m} - 2^{-(3m+2)}\}$;

a pair of adders for adding the results obtained by said first and second pairs of subtractors, thus obtaining the coordinates $x_n\{1 - 2^{-(2m+1)}\} + y_n\{2^{-m} - 2^{-(3m+2)}\} = x_{n+1}$ and $y_n\{1 - 2^{-(2m+1)}\} + x_n\{2^{-(3m+2)} - 2^{-m}\} = y_{n+1}$, and sending these coordinates to said $x_n$ and $y_n$ input means to begin the next iteration; and a pair of output means for receiving the coordinates $x_{n+1}$ and $y_{n+1}$ and returning the coordinates to said control unit.

13. A device as in claim 12, wherein said control unit comprises a pair of rounding means for receiving said coordinates $x_{n+1}$ and $y_{n+1}$ from said output means and rounding said coordinates $x_{n+1}$ and $y_{n+1}$ off to the nearest integer.

* * * * *